(12) United States Patent
Raley et al.

(10) Patent No.: US 8,127,123 B2
(45) Date of Patent: *Feb. 28, 2012

(54) METHOD AND SYSTEM FOR MIGRATING INFORMATION BETWEEN INFORMATION HANDLING SYSTEMS

(75) Inventors: Jefferson Raley, Austin, TX (US); Shaofei Chen, Austin, TX (US); Marc Jarvis, Belton, TX (US); Craig Rones, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 603 days.

This patent is subject to a terminal disclaimer.

(21) Appl. No.: 12/211,374

(22) Filed: Sep. 16, 2008

(65) Prior Publication Data

US 2009/0013169 A1 Jan. 8, 2009

Related U.S. Application Data

(63) Continuation of application No. 11/132,778, filed on May 19, 2005, now Pat. No. 7,467,292.

(51) Int. Cl.
*G06G 17/30* (2006.01)
(52) U.S. Cl. .......... 713/1; 713/2; 713/100; 717/148; 715/243; 709/203; 709/206
(58) Field of Classification Search .......... 713/1, 2, 713/100; 717/148; 715/243; 709/203, 206
See application file for complete search history.

(56) References Cited

U.S. PATENT DOCUMENTS

| | | | |
|---|---|---|---|
| 6,466,952 B2 | 10/2002 | Hanes et al. | |
| 6,735,691 B1 | 5/2004 | Capps et al. | |
| 6,795,835 B2 | 9/2004 | Ricart et al. | |
| 6,996,589 B1 * | 2/2006 | Jayaram et al. | 1/1 |
| 7,010,624 B1 | 3/2006 | Zhou et al. | |
| 7,065,549 B2 | 6/2006 | Sun et al. | |
| 7,334,076 B2 * | 2/2008 | Hendel et al. | 711/6 |
| 7,467,292 B2 * | 12/2008 | Raley et al. | 713/1 |
| 7,533,097 B2 * | 5/2009 | Ayediran et al. | 1/1 |
| 7,673,232 B2 * | 3/2010 | Rashid et al. | 715/243 |
| 2002/0010808 A1 | 1/2002 | Wiggins et al. | |
| 2002/0156784 A1 | 10/2002 | Hanes et al. | |
| 2003/0018746 A1 | 1/2003 | Boesch | |
| 2004/0098419 A1 | 5/2004 | Bantz et al. | |
| 2004/0221019 A1 | 11/2004 | Swildens et al. | |
| 2005/0223145 A1 | 10/2005 | Lin et al. | |
| 2005/0289104 A1 * | 12/2005 | Ayediran et al. | 707/1 |
| 2006/0074916 A1 | 4/2006 | Beary | |
| 2007/0130566 A1 | 6/2007 | van Rietschote et al. | |
| 2007/0192681 A1 * | 8/2007 | Rashid et al. | 715/513 |

* cited by examiner

*Primary Examiner* — M Elamin
(74) *Attorney, Agent, or Firm* — Haynes and Boone, LLP

(57) ABSTRACT

A system for migrating information includes a first information handling system (IHS). The first IHS is for, in response to a first boot event, booting from a computer readable medium, bypassing the first IHS user authentication requirement, and establishing a connection between the first IHS and a second IHS. The system for migrating information also includes the second IHS, coupled to the first IHS. The second IHS is for, in response to a second boot event, booting from a storage device of the second IHS, establishing the connection between the first IHS and the second IHS, and migrating information from the first IHS to the second IHS.

19 Claims, 6 Drawing Sheets

METHOD AND SYSTEM FOR MIGRATING INFORMATION BETWEEN INFORMATION HANDLING SYSTEMS

CROSS REFERENCE TO RELATED APPLICATIONS

The present application claims priority to and is a continuation of co-owned U.S. Utility application Ser. No. 11/132,778, filed on May 19, 2005, now U.S. Pat. No. 7,467,292 and is related to U.S. Utility Divisional application Ser. No. 12/053,080, filed on Mar. 21, 2008, now U.S. Pat. No. 7,953,964, the disclosures which are incorporated herein by reference.

BACKGROUND

The description herein relates generally to information handling systems (IHSs) and more particularly to migrating information between IHSs.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In some situations, an owner (e.g., an organization such as a corporation or a government agency) of an IHS replaces such IHS with another IHS. In one example, a corporation periodically replaces one or more of its IHSs with IHSs that are improved (e.g., by incorporating more modern technology). In replacing an existing IHS, an owner typically transfers (e.g., migrates) information (e.g., data, configuration information, and/or "settings") stored in the existing IHS to a replacement IHS. With a conventional technique, such migration of information is relatively complex and may cause various problems such as increase in cost (e.g., cost of enlisting a technician's help to perform the migration) and increase in time for migrating information from the existing IHS to the replacement IHS.

What is needed is to enhance migrating information between IHSs, without the disadvantages discussed above.

SUMMARY

Accordingly, several embodiments for migrating information are provided. A method includes coupling a first information handling system ("IHS") to a second IHS. The method also includes providing a first boot event for the first IHS, wherein, in response to the first boot event, the first IHS boots from a computer readable medium, bypasses the first IHS' user authentication requirement, and establishes a connection between the first IHS and the second IHS. Moreover, the method includes providing a second boot event for the second IHS, wherein, in response to the second boot event, the second IHS boots from a storage device of the second IHS, establishes the connection between the first IHS and the second IHS, and migrates information from the first IHS to the second IHS.

DETAILED DESCRIPTION

For purposes of this disclosure, an information handling system ("IHS") may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit ("CPU") or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
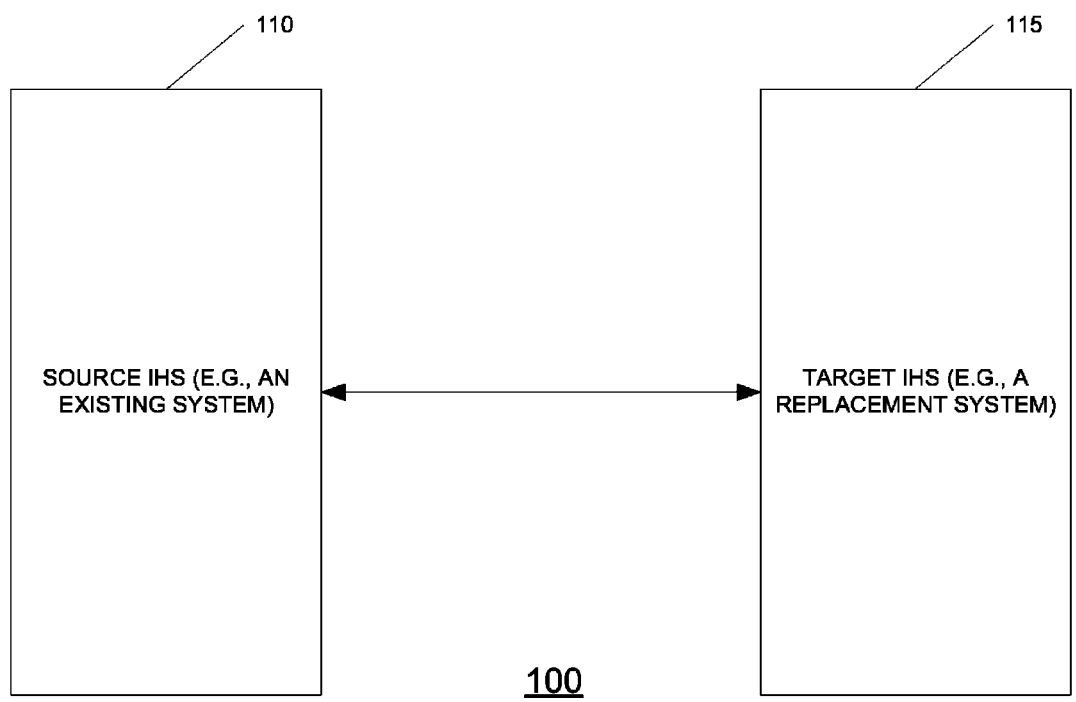
FIG. 1 is a block diagram of a system according to an illustrative embodiment.

FIG. 1 is a block diagram of a system, indicated generally at 100, for migrating information from a first IHS to a second IHS, according to an illustrative embodiment. Accordingly, the system 100 includes a source IHS 110 coupled to a target IHS 115. In one example, the source IHS 110 is an existing IHS, and the target IHS 115 is a replacement IHS. The source IHS 110 includes information (e.g., data and instructions) that is specified for migration to the replacement IHS 115. The IHS 110 and the IHS 115 are coupled to one another via a cable (e.g., a cross-over cable) as discussed below (in connection with FIGS. 3 and 4).

Figure 2:
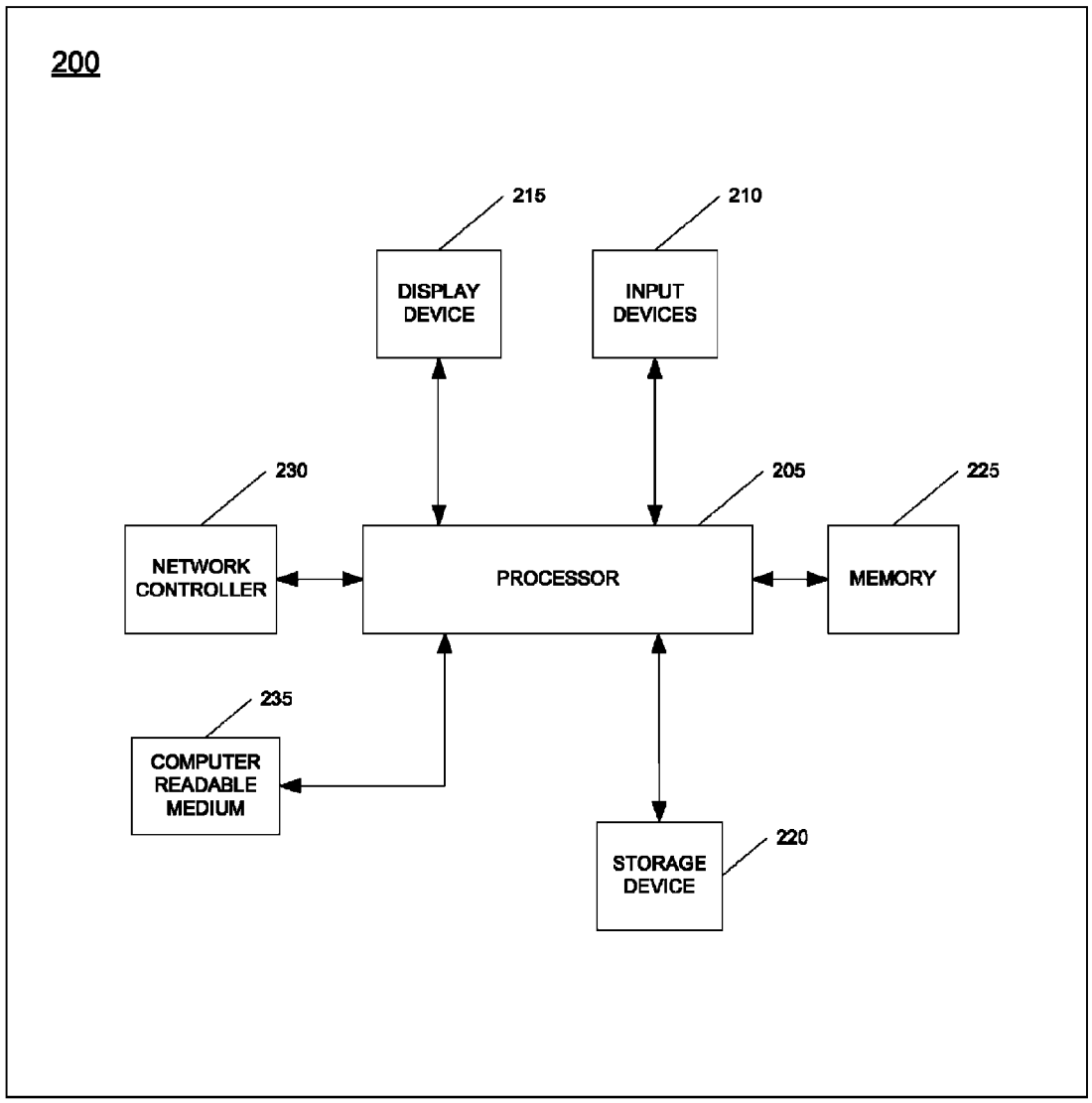
FIG. 2 is a block diagram of an information handling system of FIG. 1.

FIG. 2 is a block diagram of an IHS, indicated generally at 200, that is representative of one of the IHSs of FIG. 1, according to the illustrative embodiment. The IHS 200 includes a processor 205 (e.g., an Intel Pentium series processor) for executing and otherwise processing instructions, input devices 210 for receiving information from a human user, a display device 215 (e.g., a cathode ray tube ("CRT") device, a projector, a liquid crystal display ("LCD") device, or a plasma display device) for displaying information to the user, a storage device 220 (e.g., a non-volatile storage device such as a hard disk drive or other computer readable medium or apparatus) for storing information, a memory device 225 (e.g., random access memory ("RAM") device and read only memory ("ROM") device), also for storing information, and a network controller 230 for communicating between the IHS 200 and a network. Each of the input devices 210, the display device 215, the storage device 220, the memory device 225, and the network controller 230 is coupled to the processor 205, and to one another. In one example, the IHS 200 includes various other electronic circuitry for performing other operations of the IHS 200, such as a print device (e.g., a ink-jet printer or a laser printer) for printing visual images on paper.

The input devices 210 include, for example, a conventional keyboard and a pointing device (e.g., a "mouse", a roller ball, or a light pen). A user operates the keyboard to input alphanumeric text information to the processor 205, and the processor receives such information from the keyboard. A user also operates the pointing device to input cursor-control information to the processor 205, and the processor 205 receives such cursor-control information from the pointing device.

Figure 3:
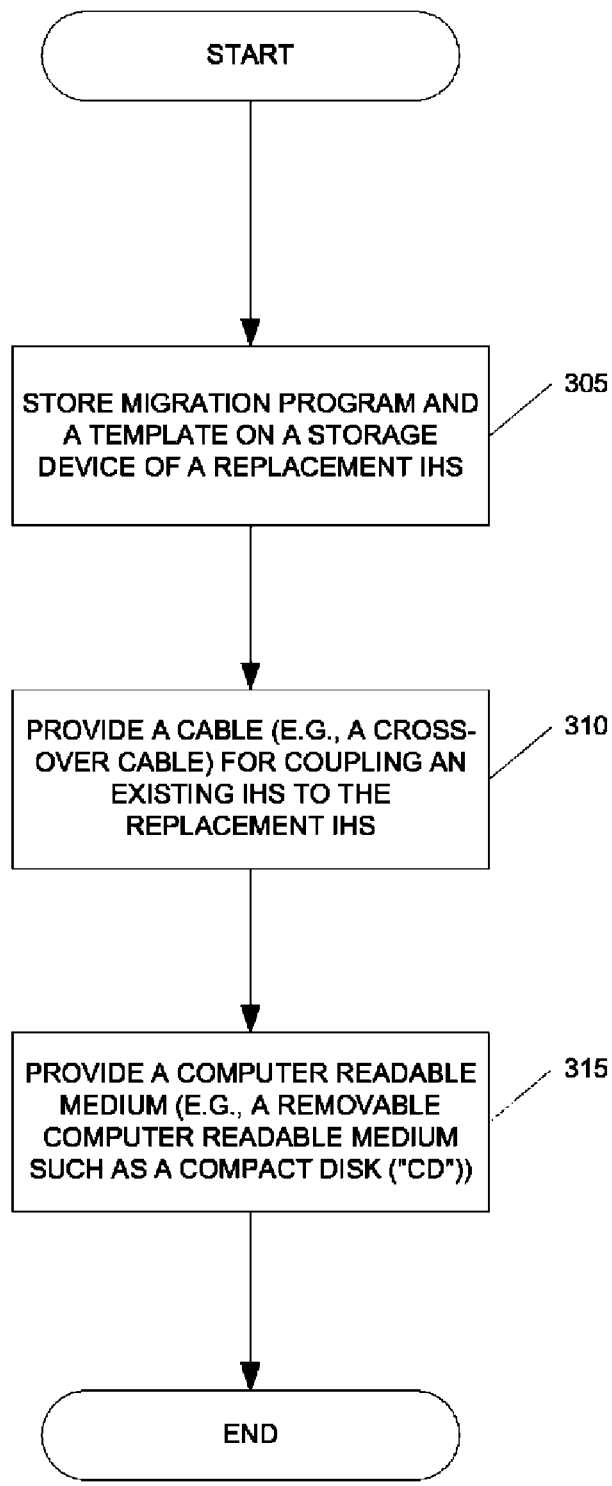
FIG. 3 is a flow chart of operations performed by a manufacturer/seller according to an illustrative embodiment.

FIG. 3 is a flow chart of operations performed by a manufacturer/seller of an IHS in providing a replacement IHS. The operation begins at a step 305, where the manufacturer/seller stores a migration program (e.g., a customized version of a commercially available migration tool such as IntelliMover and Desktop DNA) on a storage device of the replacement IHS. At the step 305, the manufacturer/seller also stores a template that is associated with an organization and/or a user. For example, the template includes indication of information (e.g., files associated with word processing, spreadsheet and other productivity computer programs) that is specified for migration according to the organization's policy. Similarly, the template also includes indication of information (e.g., files associated with games, music, and other non-productivity computer programs) that is excluded from migration. Moreover, the template includes various configuration information such as network configuration information (e.g., network domain information), modem information, and other configuration information associated with the organization. In one example, the manufacturer/seller performs the operations of the step 305 at a factory (e.g., during a manufacturing stage). After the step 305, the operation continues to a step 310.

At the step 310, the manufacturer/seller provides a cable for coupling an existing IHS and the replacement IHS to one another (e.g., by packing the cable with the replacement system). In one example the cable is a crossover cable (e.g., a network crossover cable or a universal serial bus ("USB") crossover cable). After the step 310, the operation continues to a step 315.

At the step 315, the manufacturer/seller provides a computer readable medium, and the computer readable medium stores one or more computer programs. The one or more computer programs include instructions, and the computer programs (more particularly, the instructions) are executable or otherwise processable by the existing IHS to perform the operations discussed below (in connection with FIG. 5). In one example, the computer readable medium is a removable computer readable medium such as a compact disk ("CD") or a digital versatile disk ("DVD"). After the step 315, the operation ends as shown.

Figure 4:
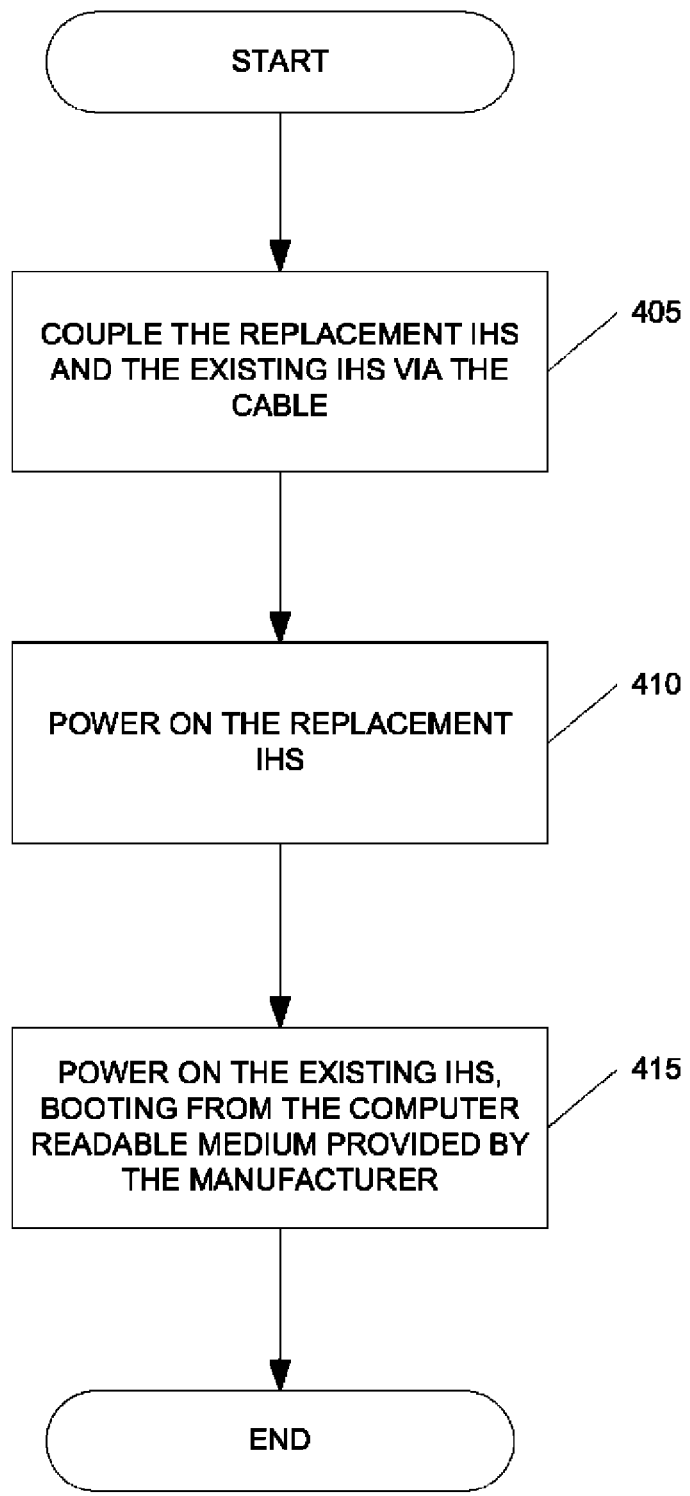
FIG. 4 is a flow chart of operations performed by a user, according to an illustrative embodiment.

After the organization receives the replacement IHS along with the cable and the computer readable medium, the existing IHS user is capable of performing the operations discussed below so that an existing IHS and a replacement IHS migrates information from the existing IHS to the replacement IHS. Accordingly, FIG. 4 is a flow chart of operations performed by a user for migrating information from an existing IHS to a replacement IHS. The operation begins at a step 405, where the user couples the replacement IHS and the existing IHS via the cable provided by the manufacturer/seller in the step 310 of FIG. 3. After the step 405, the operation continues to a step 410.

At the step 410, the user powers on the replacement IHS. After the step 410, the operation continues to a step 415, where the user powers on the existing IHS. In more detail, when the user powers on the existing IHS, it boots from the computer readable medium provided by the manufacturer/seller in the step 315 of FIG. 3. For clarity, the following discussion references such computer readable medium provided by the manufacturer/seller as a CD provided by the manufacturer/seller. In the above example, the operations of the step 410 and 415 are reversible such that in one example, user powers on the existing IHS before powering on the replacement IHS. After the step 415, the operation ends.

As discussed above, with a conventional technique, migrating information from an existing IHS to a replacement IHS is relatively complex such that the technique is suitable for a technician or a technically skilled user. However, with the illustrative embodiments, migrating information is less complex. For example, a user without technical skill is capable of performing the operations discussed above (in connection with FIG. 4) to initiate migration of information from the existing IHS to the replacement IHS. In response to the user performing such operations, the existing IHS and the replacement IHS performs the operations discussed below in connection with FIGS. 5 and 6, respectively.

Figure 5:
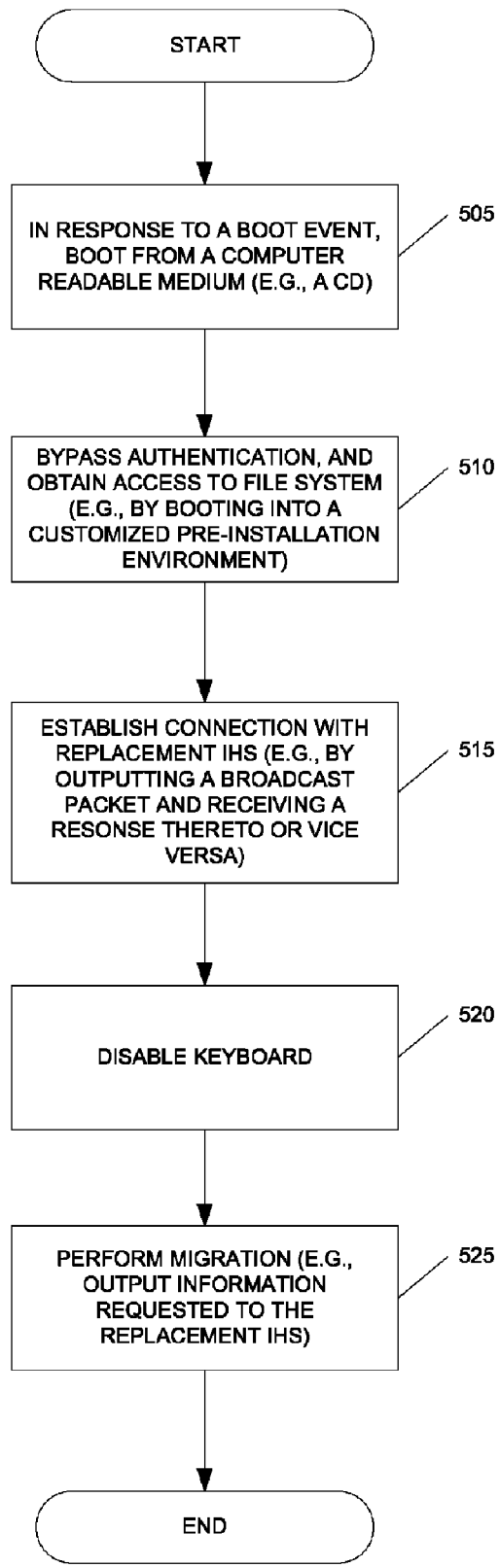
FIG. 5 is a flow chart of operations performed by an existing information handling system, according to an illustrative embodiment.

Accordingly, FIG. 5 is a flow chart of operations performed by the existing IHS for migrating information to the replacement IHS. The operation begins at a step 505, where the existing IHS, in response to a boot event (e.g., the user powering on the existing IHS as discussed in connection with the step 415), boots from the CD provided by the manufacturer/seller. After the step 505, the operation continues to a step 510.

At the step 510, the existing IHS bypasses authentication requirements (e.g., requirement to input user identification information ("user ID") and/or password) and obtains access to the IHS' file system (e.g., a file system including information specified for migration) by processing (e.g., executing) instructions included in the CD provided by the manufacturer/seller. Such instructions are included in a computer program such as an operating system's ("OS'") pre-installation environment. In one example, such pre-installation environment is Microsoft Windows Pre-installation Environment ("Windows PE"), which is customizable. After the step 510, the operation continues to a step 515.

At the step 515, the existing IHS establishes a connection (e.g., an electronic communications connection such as a network connection) with the replacement IHS via the cable. Such connection is for migrating information from the existing IHS to the replacement IHS. In one example, the existing IHS establishes the connection by outputting a broadcast packet (e.g., a network packet). The replacement IHS receives the broadcast packet, and in response thereto, outputs a response to the existing IHS. The existing IHS receives such response from the replacement IHS. By comparison, in another example, the replacement IHS outputs a broadcast packet. The existing IHS receives the broadcast packet, and in response thereto, outputs a response to the replacement IHS. The replacement IHS receives the response from the existing IHS. The existing IHS establishes the connection as discussed above by executing instructions included in the CD provided by the manufacturer/seller. After the step 515, the operation continues to a step 520.

At the step 520, the existing IHS optionally disables its input devices (e.g., keyboard, mouse, or other pointing devices) so that the user is not able to interrupt the existing IHS while information is migrated. After the step 520, the operation continues to a step 525.

At the step 525, the existing IHS migrates information to the replacement IHS by outputting (e.g., in response to a request from the replacement IHS) information from its storage device to the replacement IHS. After the step 525, the operation ends.

Figure 6:
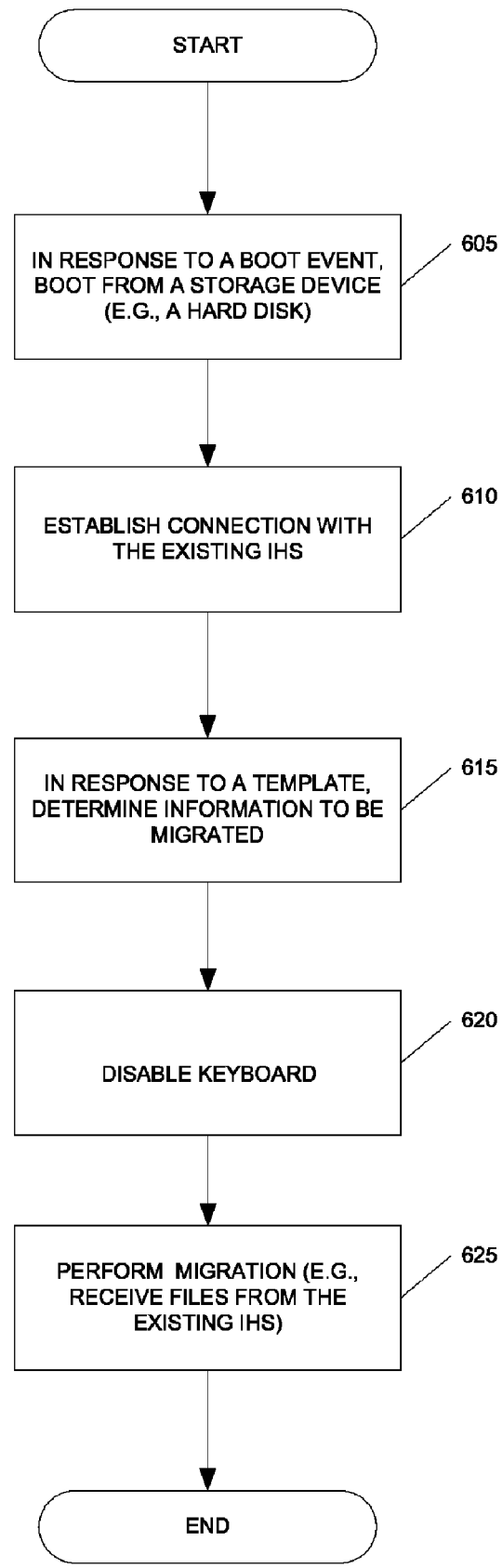
FIG. 6 is a flow chart of operations performed by a replacement information handling system, according to an illustrative embodiment.

FIG. 6 is a flow chart of operations performed by the replacement IHS for migrating information from the existing IHS. The operation begins at a step 605, where the replacement IHS, in response to a boot event (e.g., the user powering on the replacement IHS as discussed above in connection with the step 410), boots from its storage device (e.g., a hard disk). After the step 605, the operation continues to a step 610.

At the step 610, the replacement IHS establishes a connection with the existing IHS as discussed above in connection with the step 515 of FIG. 5. After the step 610, the operation continues to a step 615.

At the step 615, the replacement IHS determines information to be migrated from the existing IHS to the replacement IHS. In one example, the replacement IHS determines such information to be migrated in response to the template discussed above in connection with the step 305 of FIG. 3. Accordingly, the information determined at the step 615 includes user data and various configuration information such as information associated with the replacement IHS' network configuration. After the step 615, the operation continues to a step 620 where the replacement IHS optionally disables its input devices in a manner substantially similar to the manner discussed above in connection with the step 520. After the step 620, the operation continues to a step 625.

At the step 625, the replacement IHS migrates the information from the existing IHS by executing the migration program discussed above in connection with the step 305. In one example, the existing IHS outputs the information as discussed above in connection with the step 525, and the replacement IHS receives such information (e.g., as in a conventional "copy" operation).

Although in the illustrative embodiment, the replacement IHS executes the migration program, in another embodiment, the existing IHS executes the migration program. In such alternative embodiment, the replacement IHS transfers the migration program (e.g., a migration "agent"), and the template to the existing IHS prior to the step 625.

Also, in the above discussions, the replacement IHS performs the operations of the steps 610, 615, 620, and 625 in response to the boot event of the step 605. However, in one embodiment, the replacement IHS performs such operations in response to executing a file (e.g., an "executable").

Referring again to FIG. 2, the computer-readable medium 235 and the IHS 200 are structurally and functionally interrelated with one another as described further below. Each IHS of the illustrative embodiment is structurally and functionally interrelated with a respective computer-readable medium, similar to the manner in which the IHS 200 is structurally and functionally interrelated with the computer-readable medium 235. In that regard, the computer-readable medium 235 is a representative one of such computer-readable media, including for example but not limited to the storage device 220.

The computer-readable medium 235 stores (e.g., encodes, or records, or embodies) functional descriptive material (e.g., including but not limited to software (also referred to as computer programs or applications) and data structures). Such functional descriptive material imparts functionality when encoded on the computer-readable medium 235. Also, such functional descriptive material is structurally and functionally interrelated to the computer-readable medium 235.

Within such functional descriptive material, data structures define structural and functional interrelationships between such data structures and the computer-readable medium 235 (and other aspects of the processor 205 and the IHS 200). Such interrelationships permit the data structures' functionality to be realized. Also, within such functional descriptive material, computer programs define structural and functional interrelationships between such computer programs and the computer-readable medium 235 (and other aspects of the processor 205 and the IHS 200). Such interrelationships permit the computer programs' functionality to be realized.

For example, the IHS 200 reads (e.g., accesses or copies) such functional descriptive material from the computer-readable medium 235 into the memory device of the IHS 200, and the IHS 200 performs its operations (as described elsewhere herein) in response to such material which is stored in the memory device of the IHS 200. More particularly, the processor 205 performs the operation of processing a computer application (that is stored, encoded, recorded or embodied on a computer-readable medium) for causing the processor 205 to perform additional operations (as described elsewhere herein). Accordingly, such functional descriptive material exhibits a functional interrelationship with the way in which processor 205 executes its processes and performs its operations.

Further, the computer-readable medium 235 is an apparatus from which the computer application is accessible by the IHS 200, and the computer application is processable by the IHS 200 for causing the processor IHS 200 to perform such additional operations. In addition to reading such functional descriptive material from the computer-readable medium 235, the IHS 200 is capable of reading such functional descriptive material from (or through) a network, which is also a computer-readable medium (or apparatus). Moreover, the memory device of the IHS 200 is itself a computer-readable medium (or apparatus).

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A method for migrating information from a first information handling system ("IHS") to a second IHS, the method comprising:

storing, on a storage device of the second IHS, a template, and a computer program processable by the second IHS for migrating information from a storage device of the first IHS to the storage device of the second IHS, wherein the template includes an indication of information that is specified for migration, an indication of information that is excluded from migration and information relating to IHS configuration; and providing a non-transitory computer readable medium for storing instructions processable by the first IHS for:

obtaining access to a file system of the storage device of the first IHS by bypassing an authentication requirement of the first HIS, wherein bypassing the first IHS authentication requirement includes booting into an operating system's ("OS") pre-installation environment; and establishing a connection between the first IHS and the second IHS for migrating information from storage device of the first IHS to the storage device of the second IHS.

2. The method of claim 1, wherein the computer readable medium is a compact disk ("CD").

3. The method of claim 1, wherein establishing the connection between the first IHS and the second IHS includes:

outputting, by the first IHS, a broadcast packet; and in response to the broadcast packet, the second IHS outputting a reply packet.

4. The method of claim 1, wherein establishing the connection between the first IHS and the second IHS includes:

outputting, by the second IHS, a broadcast packet; and in response to the broadcast packet, the first IHS outputting a reply packet.

5. The method of claim 1, wherein the instructions processable by the first IHS are further for disabling an input device for the second IHS.

6. The method of claim 1, wherein the pre-installation environment is Windows Pre-installation Environment ("Windows PE").

7. The method of claim 1, wherein the information migrated is determined in response to the template.

8. The method of claim 1, wherein the establishing connection is via a network connection.

9. The method of claim 1, wherein the network connection is a wireless connection.

10. A method for migrating information from a first information handling system ("IHS") to a replacement IHS, the method comprising:

storing, on a storage device of the replacement IHS, a template, and a computer program processable by the replacement IHS for migrating information from a storage device of the first IHS to the storage device of the replacement IHS, wherein the template includes an indication of information that is specified for migration, an indication of information that is excluded from migration and information relating to IHS configuration; and providing a non-volatile storage device for storing instructions processable by the first IHS for:

obtaining access to a file system of the storage device of the first IHS; and establishing a connection between the first IHS and the replacement IHS for migrating information from storage device of the first IHS to the storage device of the replacement IHS, wherein the establishing the connection includes an exchange of a broadcast packet and a reply packet between the first IHS and the second IHS.

11. The method of claim 1, wherein the non-volatile storage device is a hard disk drive.

12. The method of claim 1, wherein establishing the connection between the first IHS and the replacement IHS includes:

outputting, by the first IHS, a broadcast packet; and in response to the broadcast packet, the replacement IHS outputting a reply packet.

13. The method of claim 1, wherein establishing the connection between the first IHS and the replacement IHS includes:

outputting, by the replacement IHS, a broadcast packet; and in response to the broadcast packet, the first IHS outputting a reply packet.

14. The method of claim 1, wherein obtaining access to information stored in the storage device of the first IHS includes:

bypassing the first IHS' authentication requirement.

15. The method of claim 5, wherein bypassing the first IHS' authentication requirement includes:

booting into an operating system's ("OS") pre-installation environment.

16. The method of claim 1, wherein the pre-installation environment is Windows Pre-installation Environment ("Windows PE").

17. The method of claim 1, wherein the information migrated is determined in response to the template.

18. The method of claim 1, wherein the establishing connection is via a network connection.

19. The method of claim 1, wherein the network connection is a wireless connection.

* * * * *